(12) United States Patent
Ideuchi et al.

(10) Patent No.: US 10,346,535 B2
(45) Date of Patent: Jul. 9, 2019

(54) APPARATUS AND METHOD FOR DATA COMPRESSION EXTENSION

(71) Applicant: FUJITSU LIMITED, Kawasaki-shi, Kanagawa (JP)

(72) Inventors: Masao Ideuchi, Hachioji (JP);
Masahiro Kataoka, Kamakura (JP);
Kazuo Mineno, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/054,494

(22) Filed: Feb. 26, 2016

(65) Prior Publication Data

US 2016/0275072 A1    Sep. 22, 2016

(30) Foreign Application Priority Data

Mar. 16, 2015   (JP) .................................. 2015-051797

(51) Int. Cl.
| | |
|---|---|
| *G06F 17/27* | (2006.01) |
| *H03M 7/30* | (2006.01) |
| *G06F 17/22* | (2006.01) |
| *G06K 9/62* | (2006.01) |
| *G06K 9/72* | (2006.01) |

(Continued)

(52) U.S. Cl.
CPC ........ *G06F 17/2715* (2013.01); *G06F 16/313* (2019.01); *G06F 16/36* (2019.01); *G06F 17/2205* (2013.01); *G06F 17/2217* (2013.01); *G06F 17/2276* (2013.01); *G06F 17/271* (2013.01); *G06F 17/277* (2013.01); *G06F 17/2735* (2013.01); *G06F 17/2785* (2013.01); *G06K 9/6212* (2013.01); *G06K 9/723* (2013.01)

(58) Field of Classification Search
CPC .... H03M 7/30; H03M 7/3084; H03M 7/3086; H03M 7/3088; G06F 17/30985
See application file for complete search history.

(56) References Cited

U.S. PATENT DOCUMENTS 5,254,990 A  * 10/1993  Yoshida .............. H03M 7/3088
                                                          341/51
5,590,317 A     12/1996  Iguchi et al.
(Continued)

FOREIGN PATENT DOCUMENTS

| EP | 1 677 210 A1 | 7/2006 |
|---|---|---|
| EP | 2 838 037 A2 | 2/2015 |

(Continued)

OTHER PUBLICATIONS

Apache Software Fundation, "MapReduce Tutorial", [online], retrieved from https://hadoop.apache.org/doc, published 2008 (Year: 2008).*

(Continued)

*Primary Examiner* — Jialong He
(74) *Attorney, Agent, or Firm* — Xsensus LLP

(57) ABSTRACT

An information processing apparatus encodes text data by using a word dictionary that allocates each of a plurality of words in a word group to a corresponding code and generates a count map indicating an appearance frequency of the plurality of words in the word group in the text data. The information processing apparatus associates the count map with encoded text data and stores it to a storage unit.

5 Claims, 11 Drawing Sheets

(51) Int. Cl.
*G06F 16/36* (2019.01)
*G06F 16/31* (2019.01)

(56) References Cited

U.S. PATENT DOCUMENTS

| | | | | |
|---|---|---|---|---|
| 5,635,932 | A * | 6/1997 | Shinagawa | G06T 9/005 341/51 |
| 5,691,717 | A * | 11/1997 | Tamura | H03M 7/3084 341/106 |
| 5,872,530 | A | 2/1999 | Domyo et al. | |
| 5,991,713 | A * | 11/1999 | Unger | H03M 7/3084 704/1 |
| 6,427,149 | B1 * | 7/2002 | Rodriguez | G06F 17/30076 707/693 |
| 6,522,268 | B2 * | 2/2003 | Belu | H03M 7/30 341/106 |
| 6,529,912 | B2 * | 3/2003 | Satoh | H03M 7/3084 707/693 |
| 6,721,753 | B1 * | 4/2004 | Kataoka | G06F 3/0608 |
| 6,993,534 | B2 | 1/2006 | Denesuk et al. | |
| 8,712,977 | B2 * | 4/2014 | Kataoka | G06F 17/30979 707/693 |
| 9,503,123 | B1 * | 11/2016 | Pinho | H03M 7/425 |
| 2002/0123897 | A1 * | 9/2002 | Matsumoto | G10L 13/06 704/500 |
| 2002/0174101 | A1 * | 11/2002 | Fernley | G06F 16/3334 |
| 2005/0198027 | A1 | 9/2005 | Hamaguchi | |
| 2006/0136365 | A1 * | 6/2006 | Kedem | G06F 3/0608 |
| 2006/0253631 | A1 * | 11/2006 | Dietrich | G06F 17/30233 710/68 |
| 2007/0096953 | A1 | 5/2007 | Odagiri | |
| 2008/0243482 | A1 * | 10/2008 | Skubacz | G06F 17/2785 704/9 |
| 2009/0132466 | A1 * | 5/2009 | Etherington | G06F 17/30312 |
| 2009/0299974 | A1 * | 12/2009 | Kataoka | G06F 17/30985 |
| 2010/0131476 | A1 * | 5/2010 | Kataoka | G06F 17/30979 707/693 |
| 2011/0161357 | A1 * | 6/2011 | Kataoka | H03M 7/40 707/769 |
| 2011/0213655 | A1 * | 9/2011 | Henkin | G06Q 30/00 705/14.49 |
| 2012/0005172 | A1 * | 1/2012 | Kataoka | G06F 17/3053 707/693 |
| 2012/0131139 | A1 * | 5/2012 | Siripurapu | G06F 17/30864 709/217 |
| 2013/0132381 | A1 * | 5/2013 | Chakrabarti | G06F 17/30277 707/730 |
| 2013/0238865 | A1 * | 9/2013 | Kataoka | G06F 12/00 711/154 |
| 2014/0059075 | A1 * | 2/2014 | Kataoka | G06F 17/30 707/769 |
| 2014/0236993 | A1 * | 8/2014 | Kataoka | G06F 17/30091 707/772 |
| 2015/0032705 | A1 | 1/2015 | Ideuchi et al. | |
| 2016/0364154 | A1 * | 12/2016 | Amidi | G06F 3/0613 |

FOREIGN PATENT DOCUMENTS

| | | |
|---|---|---|
| EP | 2 838 037 A3 | 2/2015 |
| JP | 5-324730 | 12/1993 |
| JP | 6-348757 | 12/1994 |
| JP | 9-214352 | 8/1997 |
| JP | 2005-530224 | 10/2005 |
| JP | 2015-26350 A | 2/2015 |
| KR | 10-2012-0123122 A | 11/2012 |
| WO | WO 03/096220 A1 | 11/2003 |

OTHER PUBLICATIONS

Guru99, "Introduction to MAPReduce", [online], retreved from Archive.org, archiving date: Jan. 2015. (Year: 2015).*
Wikipedia, "MapReduce", [online], retrieved from Archive.org, archiving date: Dec. 2014. (Year: 2014).*
Seki, Yohei. "Sentence Extraction by tf/idf and position weighting from Newspaper Articles." (2002). (Year: 2002).*
Wikipedia, "tf-idf", [online] https://wikipedia.org/wiki/Tf-idf, retrieved from www.archive.org, archive date: Dec. 30, 2014. (Year: 2014).*
Extended European Search Report dated Jul. 18, 2016 in Patent Application No. 16157605.3.
Office Action dated Dec. 21, 2016 in Korean Patent Application No. 10-2016-0023575 (with English language translation).
Australian Office Action dated Jan. 18, 2017 in Patent Application No. 2016201253.
Office Action dated Oct. 14, 2016 in Australian Patent Application No. 2016201253.
Office Action dated Jun. 28, 2017 in Korean Patent Application No. 10-2016-0023575 (with English translation).
Office Action dated Apr. 24, 2017 in Australian Patent Application No. 2016201253.
Australian Office Action dated Sep. 27, 2018 for Australian Application No. 2017248412 (3 pages).
Chinese Office Action dated Sep. 27, 2018 for Chinese Application No. 201610108617.4, and English translation thereof.
Japanese Office Action dated Nov. 27, 2018 for Japanese Patent Application No. 2015-051797, and English translation thereof.
Office Action dated Aug. 30, 2017 in Australian Patent Application No. 2016201253.
Office Action dated Oct. 26, 2017 in Korean Application No. 10-2016-0023575 (w/English translation).

* cited by examiner

APPARATUS AND METHOD FOR DATA COMPRESSION EXTENSION

CROSS-REFERENCE TO RELATED APPLICATION(S)

This application is based upon and claims the benefit of priority of the prior Japanese Patent Application No. 2015-051797, filed on Mar. 16, 2015, the entire contents of which are incorporated herein by reference.

FIELD

The embodiment discussed herein is related to a data management program and the like.

BACKGROUND

A technique has been disclosed that refers to a code conversion dictionary which stores a pair of a word having one meaning unit and a compression code and compresses and converts the input document data to the compressed data (for example, refer to Japanese Laid-open Patent Publication No. 5-324730).

Here, there is a case where text mining processing is performed based on the compressed and converted compressed data. In this case, first, extension processing is performed to the compressed data, and the text mining processing such as lexical analysis, syntax analysis, and semantic analysis is performed relative to the extension data obtained by the extension processing.

Also, a technique has been disclosed that divides the document data into words, calculates an appearance frequency of the divided word, and creates a word appearance frequency table in which the words are sorted in an order of the appearance frequency (for example, refer to Japanese Laid-open Patent Publication No. 6-348757 and the like). The processing for dividing the document data into the words is referred to as the lexical analysis.

[Patent Literature 1] Japanese Laid-open Patent Publication No. 5-324730

[Patent Literature 2] Japanese Laid-open Patent Publication No. 9-214352

[Patent Literature 3] Japanese Laid-open Patent Publication No. 6-348757

[Patent Literature 4] Japanese National Publication of International Patent Application No. 2005-530224

However, there is a problem in that a processing time to obtain processing result of the text mining processing gets longer when the text mining processing is performed based on the compressed data. That is, when the text mining processing is performed based on the compressed data, the extension processing is performed relative to the compressed data, and the text mining processing is performed relative to the extension data obtained by the extension processing. Therefore, the processing time from an instruction to perform the text mining processing to a time when the execution result is obtained gets longer.

Here, the problem in that the processing time from the instruction to perform the text mining processing to the time when the execution result is obtained will be described with reference to FIG. 1. FIG. 1 is a diagram of exemplary data management processing. A case where LZ77 and LZ78 compression algorithms are applied is illustrated in FIG. 1. As illustrated in FIG. 1, the data management processing compresses an uncompressed file by using a longest matching string and manages the compressed file. In the data management processing, when the instruction to perform the text mining processing is received, the compressed file to which the text mining processing is performed is extended, and the lexical analysis is performed. That is, the data management processing divides the extended string into words. In the data management processing, the divided words are counted, and a count result which is a result of the count is generated. In the data management processing, the generated count result is utilized for the text mining processing, and the execution result of the text mining processing is output. In this way, in the data management processing, before the text mining processing based on the compressed file is performed, the extension processing is performed relative to the compressed file. Therefore, the processing time from the instruction to perform the text mining processing to the time when the execution result is obtained gets longer.

Even when the technique for creating the word appearance frequency table is used, in a case where the word appearance frequency table is created based on the compressed data, the extension processing is performed to the compressed data first. After that, the lexical analysis, calculation of the appearance frequency, and creation of the word appearance frequency table are performed to the extension data. Therefore, the processing time from the instruction to perform the text mining processing including the processing for creating the word appearance frequency table to the time when the execution result is obtained gets longer.

SUMMARY

According to an aspect of an embodiment, a non-transitory computer-readable recording medium has stored therein a data management program. The data management program causes a computer to execute a process. The process includes encoding text data by using an encoding dictionary that allocates each of a plurality of words in a word group to a corresponding code; generating frequency information indicating an appearance frequency of the plurality of words in the word group in the text data; and storing the frequency information to a storage unit associating the frequency information with the encoded text data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the embodiment.

Figure 1:
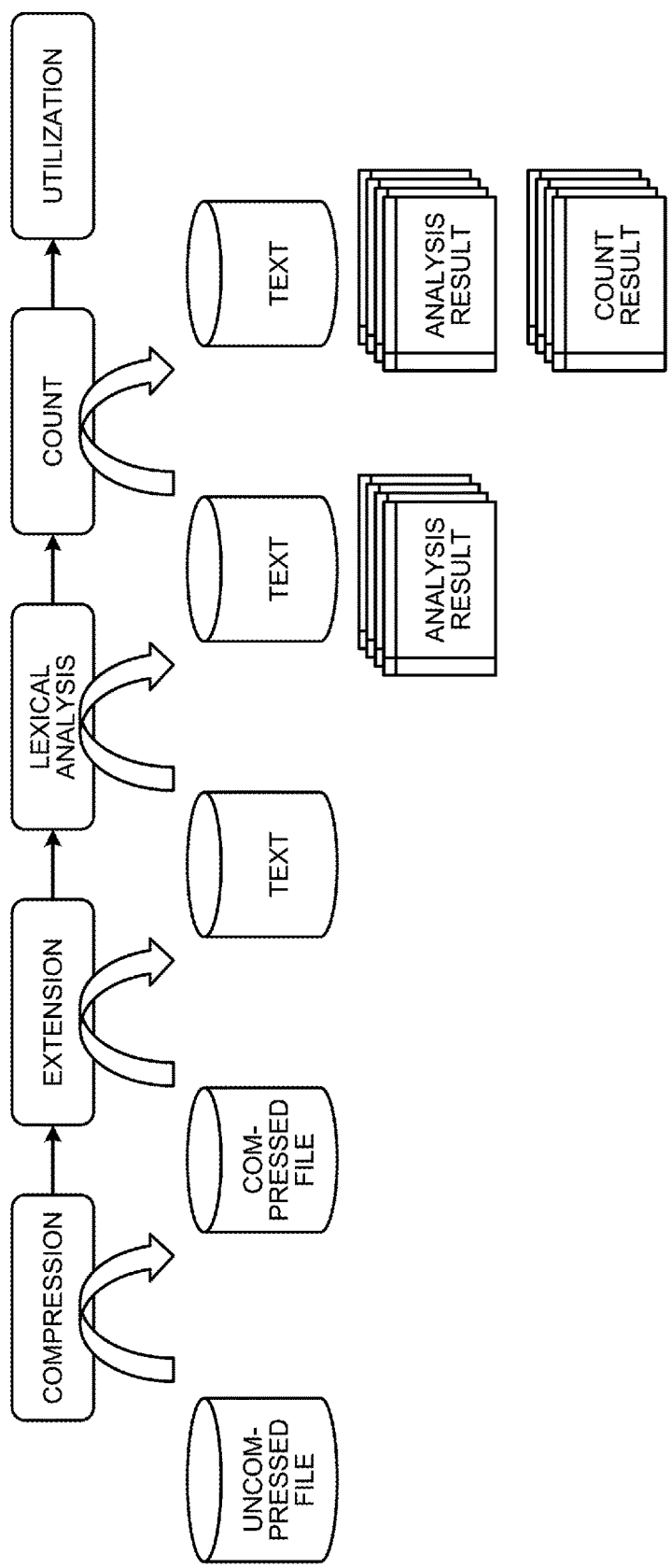
FIG. 1 is a diagram of exemplary data management processing.
Figure 2:
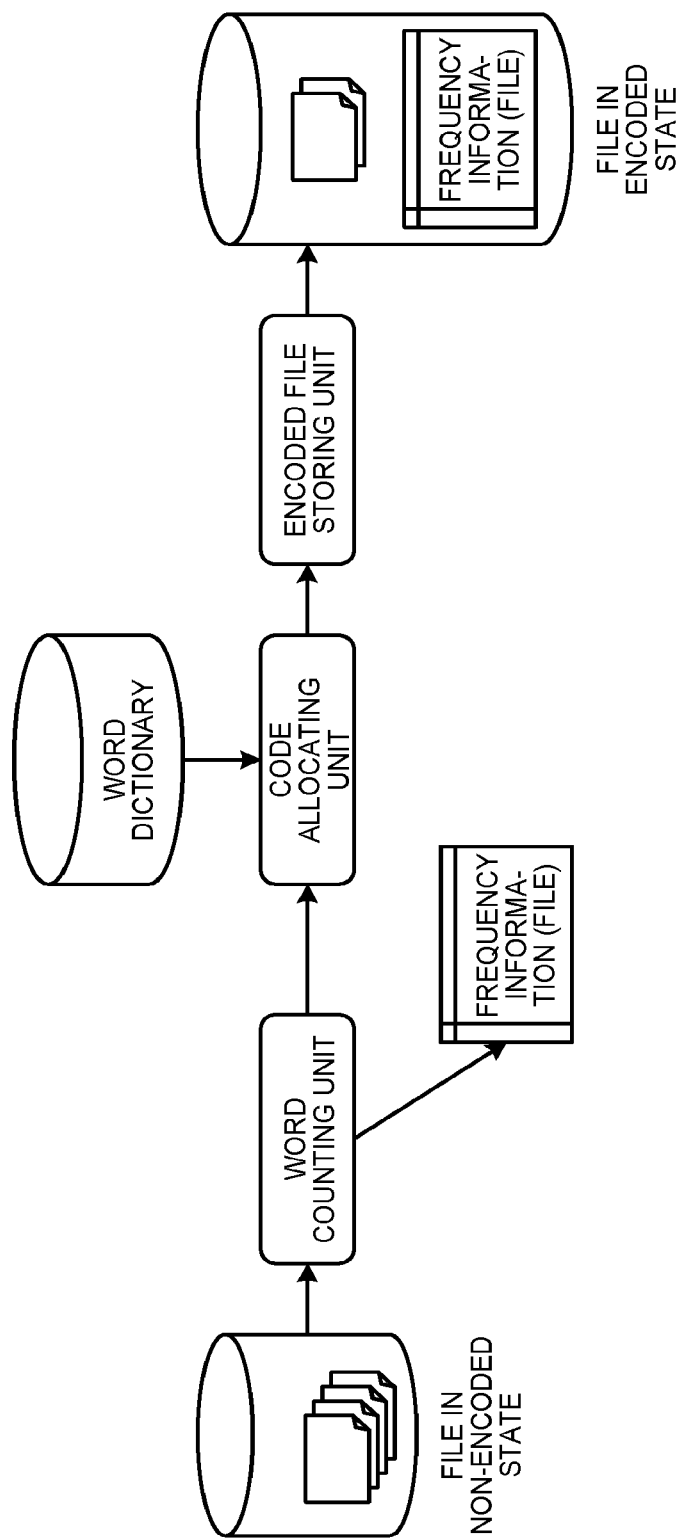
FIG. 2 is a diagram of exemplary data management processing according to an embodiment.

FIG. 2 is a diagram of exemplary data management processing according to the present embodiment.

As illustrated in FIG. 2, the data management processing includes processing by a word counting unit, processing by a code allocating unit, and an encoded file storing unit. A file in a non-encoded state includes a plurality of documents in a non-encoded state. The word counting unit divides the file in the non-encoded state into words. For example, it is assumed that a string included in the file in the non-encoded state be "He is able to . . . ". Then, the word counting unit separates the string by words such as "He" "is" "able" "to" and divides it into words.

The word counting unit counts the number of appearances for each divided word. The word counting unit generates frequency information which is a result of counting the number of appearances for each word. That is, the frequency information is the result of frequency count for each word and is generated by a unit of the document. The word counting unit stores the generated frequency information to a storage unit. A data structure of the frequency information will be described in detail below.

The code allocating unit allocates each divided word to a code by using the word dictionary. For example, a compression code is exemplified as the code. However, the code is not limited to this. The word dictionary is a dictionary for corresponding the word which appears in the document to a part of speech and the code based on a general dictionary and textbook. In the word dictionary, the part of speech and the code corresponding to each word have been previously registered. An exemplary data structure of the word dictionary will be described below.

The encoded file storing unit associates the generated frequency information with the encoded string data and stores it to the storage unit. That is, the encoded file storing unit generates a file in an encoded state (encoded file) including the encoded string data and the frequency information and stores the generated encoded file into the storage unit. A data structure of the encoded file will be described in detail below.

Accordingly, in the data management processing, the encoded file includes the frequency information. Therefore, when the text mining processing is performed based on the encoded file, the text mining processing can be performed by using the frequency information without extending the encoded file. As a result of this, a processing time of the data management processing from an instruction to perform the text mining processing to a time when the execution result is obtained can be reduced.

Structure of Information Processing Apparatus

Figure 3:
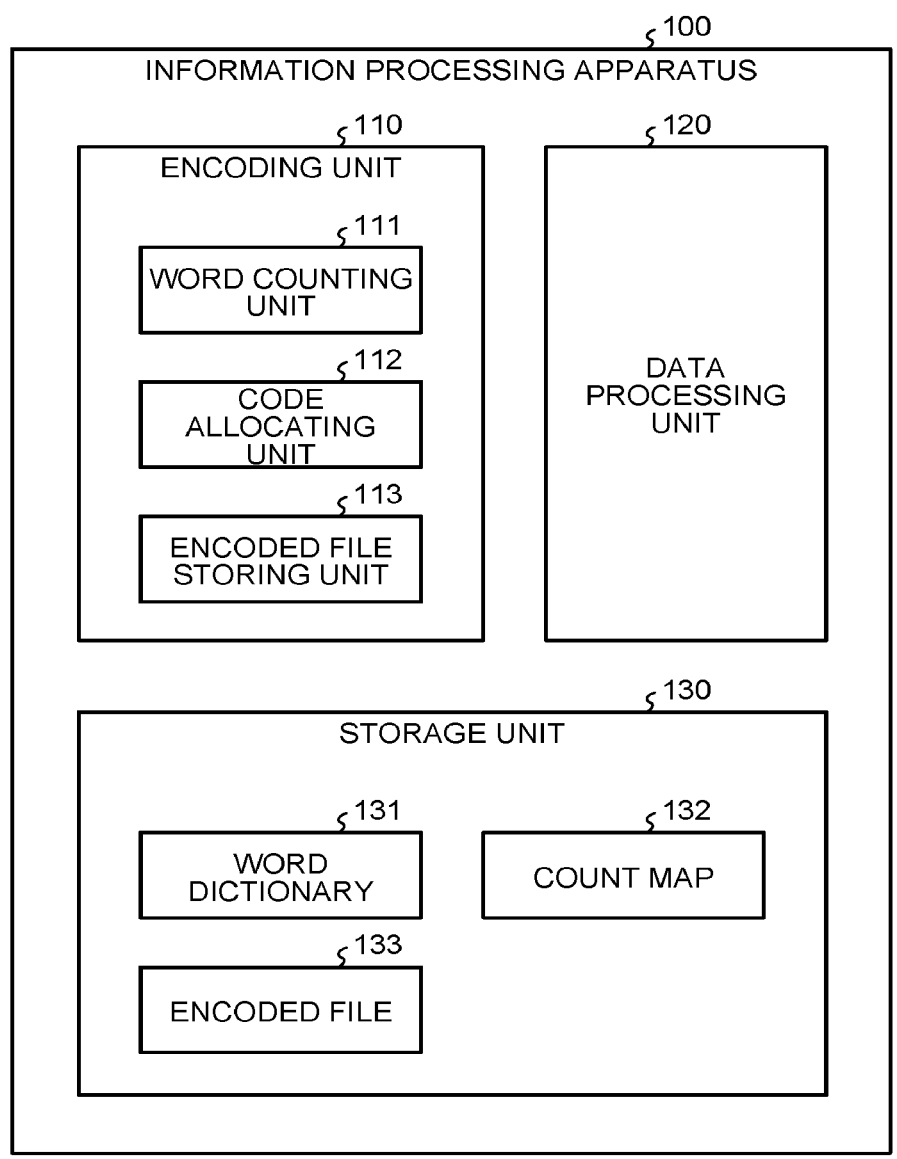
FIG. 3 is a function block diagram of a structure of an information processing apparatus according to the embodiment.

FIG. 3 is a function block diagram of a structure of an information processing apparatus according to the embodiment. As illustrated in FIG. 3, an information processing apparatus 100 includes an encoding unit 110, a data processing unit 120, and a storage unit 130.

The encoding unit 110 performs the processing illustrated in FIG. 2. The encoding unit 110 includes a word counting unit 111, a code allocating unit 112, and an encoded file storing unit 113.

The data processing unit 120 is a controller for performing the data processing such as the text mining processing.

The storage unit 130 corresponds to a storage device such as a non-volatile semiconductor memory device. For example, the non-volatile semiconductor memory device includes a flash memory and a ferroelectric random access memory (FRAM) (recorded trademark). The storage unit 130 includes a word dictionary 131, a count map 132, and an encoded file 133.

Example of Word Dictionary

Figure 4:
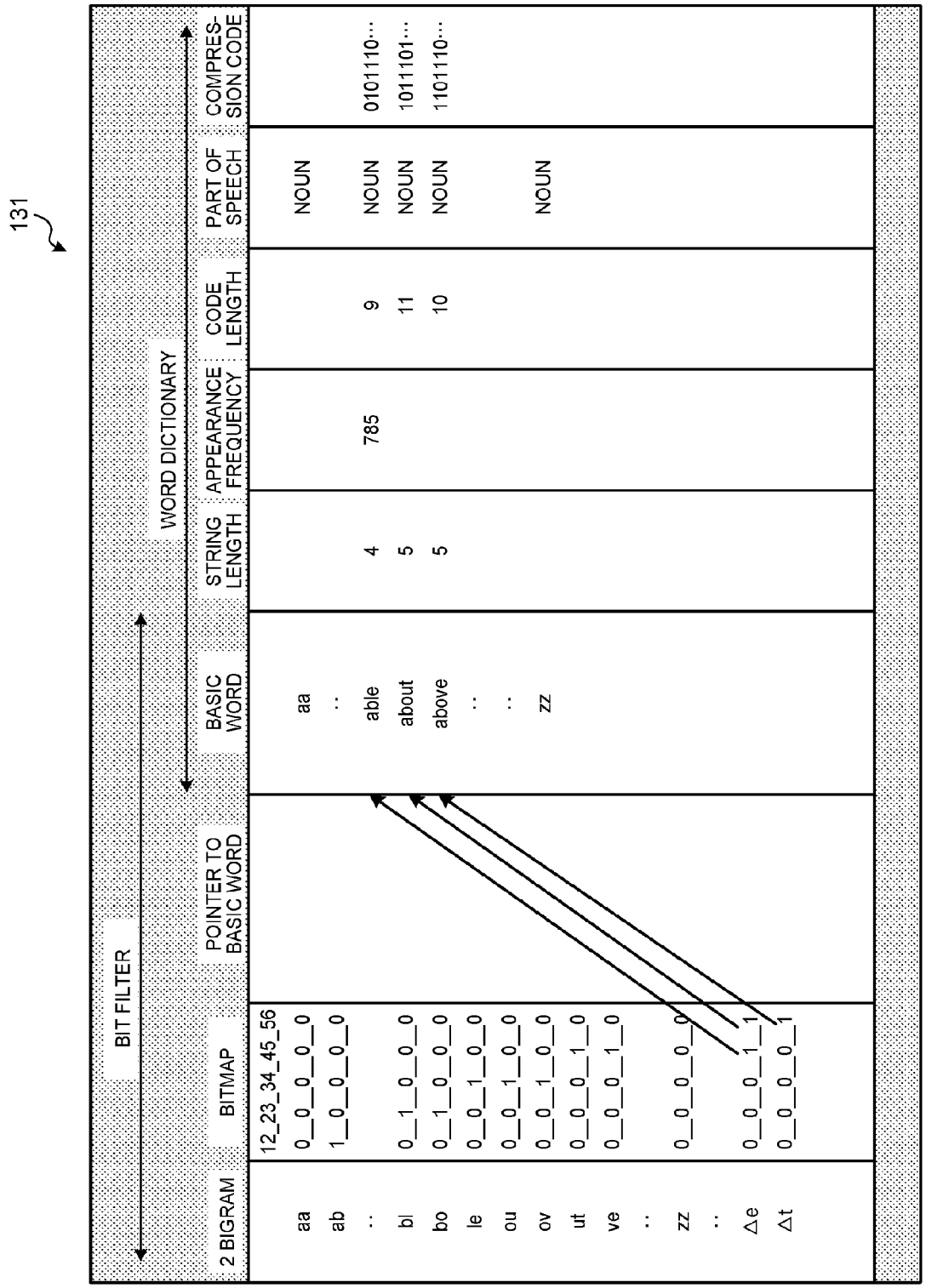
FIG. 4 is a diagram of an exemplary word dictionary according to the embodiment.

FIG. 4 is a diagram of an exemplary word dictionary according to the embodiment. The word dictionary 131 corresponds to the word dictionary illustrated in FIG. 2. As illustrated in FIG. 4, the word dictionary 131 includes a basic word, a string length, an appearance frequency, a code length, a part of speech, and a compression code and corresponds them to each other. The "basic word" is a word registered in the word dictionary 131. For example, the "basic words" are about 190,000 words which have been previously extracted from dictionaries and text groups. The number of words registered as the "basic word" may be optionally selected.

The "string length" is the length of the string of the basic word. The "appearance frequency" is the number of appearances of each basic word in a text file group for counting the frequency. Here, the text file group for counting the frequency is one or more text files for counting the appearance frequency of each basic word and is prepared separately from the file for performing the data processing. Here, it is indicated that the basic word "able" is appeared "785" times in the text file group for counting the frequency.

The "part of speech" is a part of speech of each basic word. Here, it is indicated that the basic word "able" is a "noun".

The "compression code" is an exemplary code. Here, the "compression code" is allocated to each basic word. The "code length" is the length of the code. As an example, a code having a shorter code length is allocated to a basic word with high appearance frequency.

Also, the word dictionary 131 includes a bit filter indicating a pointer to the basic word. The bit filter corresponds to a bigram, a bitmap, and the basic word to each other. The "bigram" is a continuous string included in each word. For example, the "able" includes bigrams corresponding to "ab", "bl", and "le".

The "bitmap" represents a bitmap corresponding to the string of the bigram. For example, the "able" is corresponded to a bitmap "1_0_0_0_0" with the bigram "ab", a bitmap "0_1_0_0_0" with the bigram "bl", and a bitmap "0_0_1_0_0" with the bigram "le" by the pointer to the basic word. For example, when obtaining the "able" from the file in the non-encoded state, the information processing apparatus 100 accesses to the basic word "able" by using the bitmap "1_0_0_0_0" with the bigram "ab", the bitmap "0_1_0_0_0" with the bigram "bl", and the bitmap "0_0_1_0_0" with the bigram "le". That is, the information processing apparatus 100 compares the bit filter with the string of the word which has been divided by a word unit from the file in the non-encoded state and determines whether the string has a hit to the bit filter. When the string has the hit to the bit filter, the information processing apparatus 100 accesses to the basic word pointed by the pointer.

Example of Count Map

Figure 5:
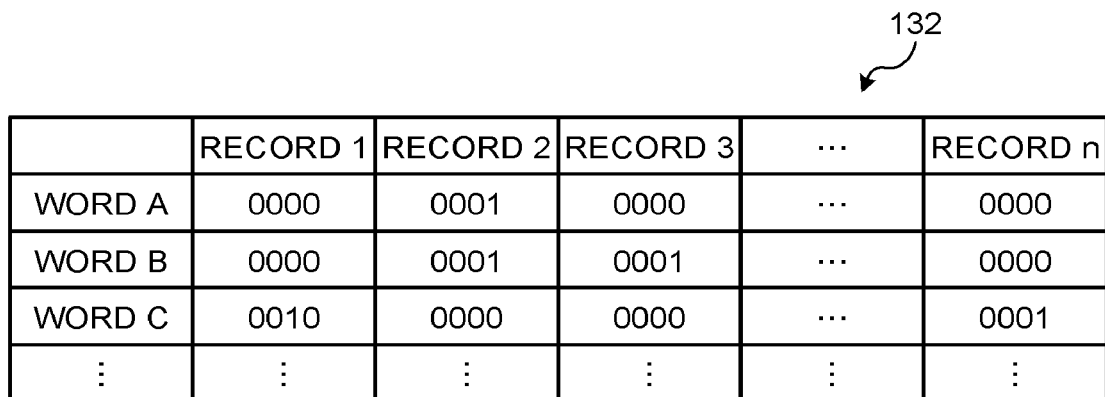
FIG. 5 is a diagram of an exemplary count map according to the embodiment.

FIG. 5 is a diagram of an exemplary count map according to the embodiment. The count map 132 corresponds to the frequency information illustrated in FIG. 2. As illustrated in FIG. 5, the count map 132 stores the number of appearances of the word included in a record for each record. The record here is a logical section in the file, and for example, each record corresponds to a document. The number of appearances is a value expressed by using four bits and expressed by numbers from zero to 15 times. As an example, in a record 1, "0000" is expressed as a word A, "0000" is expressed as a word B, and "0010" is expressed as a word C. In a record 2, "0001" is expressed as the word A, "0001" is expressed as the word B, and "0000" is expressed as the word C. It has been described that the number of appearances is the value expressed by using four bits. However, the number of appearances is not limited to this and may be a value expressed by using five bits or three bits. That is, it is preferable that the number of bits expressing the number of appearances be a value which is adjusted according to the content of the file to which the data processing is performed.

Example of Encoded File

Figure 6:
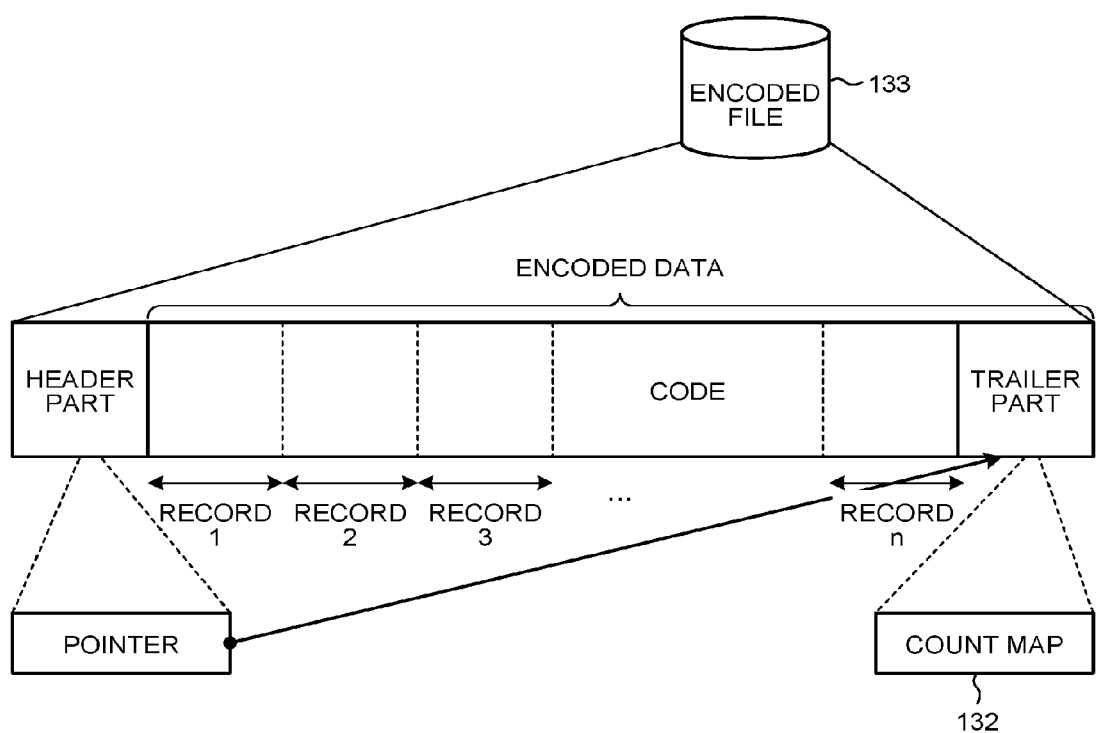
FIG. 6 is a diagram of an exemplary encoded file according to the embodiment.

FIG. 6 is a diagram of an exemplary encoded file according to the embodiment. The encoded file 133 corresponds to the file in the encoded state illustrated in FIG. 2. As illustrated in FIG. 6, the encoded file 133 includes a header part, encoded data, and a trailer part. The encoded data stores a code allocated to each word for each record. The trailer part stores the count map 132. When there is other information used at the time of encode processing, the trailer part also stores the information.

The header part stores the pointer to the count map 132 stored in the trailer part. At the time of data processing by the data processing unit 120 to be described, the information processing apparatus 100 can refer to the count map 132 by using the pointer to the count map 132 of the header part.

The description returns to FIG. 3. The word counting unit 111 counts the number of appearances for each word relative to the document data to be encoded. The document data to be encoded includes a plurality of records in the non-encoded state. For example, the word counting unit 111 performs lexical analysis to the document data to be encoded. That is, the word counting unit 111 divides the document data to be encoded into words. The word counting unit 111 counts the number of appearances for each divided word. The number of appearances for each word is counted for each record. The word counting unit 111 generates the count map 132 by using the number of appearances for each record and word. The word counting unit 111 stores the count map 132 to the storage unit 130.

As an example, it is assumed that a string included in the document data to be encoded be "He is able to . . . ". Then, the word counting unit 111 separates the string by words such as "He" "is" "able" "to" and divides it into words. The word counting unit 111 counts the number of appearances for each of the divided words "He" "is" "able" "to" . . . . It is assumed that the document data include the record 1 and the record 2. Then, the word counting unit 111 generates the count map 132 by using the number of appearances of each word "He" "is" "able" "to" . . . relative to the record 1. The word counting unit 111 generates the count map 132 by using the number of appearances of each word "He" "is" "able" "to" . . . relative to the record 2. The word counting unit 111 stores the generated count map 132 to the storage unit 130.

The code allocating unit 112 allocates each divided word to the code based on the word dictionary 131. For example, the code allocating unit 112 selects the word divided by the word counting unit 111 one by one. The code allocating unit 112 obtains a compression code of the selected word from the word dictionary 131. The code allocating unit 112 allocates the obtained compression code to the selected word. The code allocating unit 112 allocates the compression codes to all the divided words and generates the encoded data of the document data to be encoded.

As an example, it is assumed that the divided words be "He", "is", "able", and "to". The code allocating unit 112 obtains a compression code of "He" from the word dictionary 131 and allocates the obtained compression code to "He". The code allocating unit 112 obtains a compression code of "is" from the word dictionary 131 and allocates the obtained compression code to "is". The code allocating unit 112 obtains a compression code of "able" from the word dictionary 131 and allocates the obtained compression code to "able". The code allocating unit 112 obtains a compression code of "to" from the word dictionary 131 and allocates the obtained compression code to "to".

The encoded file storing unit 113 associates the count map 132 with the encoded data and stores it to the storage unit 130. For example, the encoded file storing unit 113 sets the encoded data to the encoded file 133 and sets the count map 132 to the trailer part of the encoded file 133. The encoded file storing unit 113 sets the pointer to the count map 132 stored in the trailer part to the header part of the encoded file 133. The encoded file storing unit 113 stores the encoded file 133 to the storage unit 130.

As an example, with the structure of the encoded file 133 illustrated in FIG. 6, the encoded file storing unit 113 sets the count map 132 to the trailer part and sets the pointer to the count map 132 to the header part. The encoded file storing unit 113 stores the encoded file 133 to the storage unit 130.

The data processing unit 120 performs data processing of the encoded file 133. For example, when receiving the instruction to perform the data processing, the data processing unit 120 obtains the count map 132 from the trailer part of the encoded file 133 to which the data processing is performed. The data processing unit 120 performs the data processing by using the count map 132. As exemplary data processing, syntax analysis and calculation processing of term frequency (tf)/inverse document frequency (idf) can be exemplified. The tf/idf is a method for weighting the word in the document used for information retrieval. As an example, the data processing unit 120 calculates a weight of a certain word in each record (document) by using the count map 132. The data processing unit 120 calculates similarity between the documents. A method for calculating the similarity between the documents includes, for example, a method for estimating tf-idf cosine similarity calculation. However, the method is not limited to this.

Accordingly, when performing the data processing based on the encoded file 133, the data processing unit 120 can perform the data processing by using the count map 132 without extending the encoded file 133. As a result, the data processing unit 120 can reduce processing time from an instruction to perform the data processing to a time when the execution result is obtained.

Processing Procedure of Encode Processing

Figure 7:
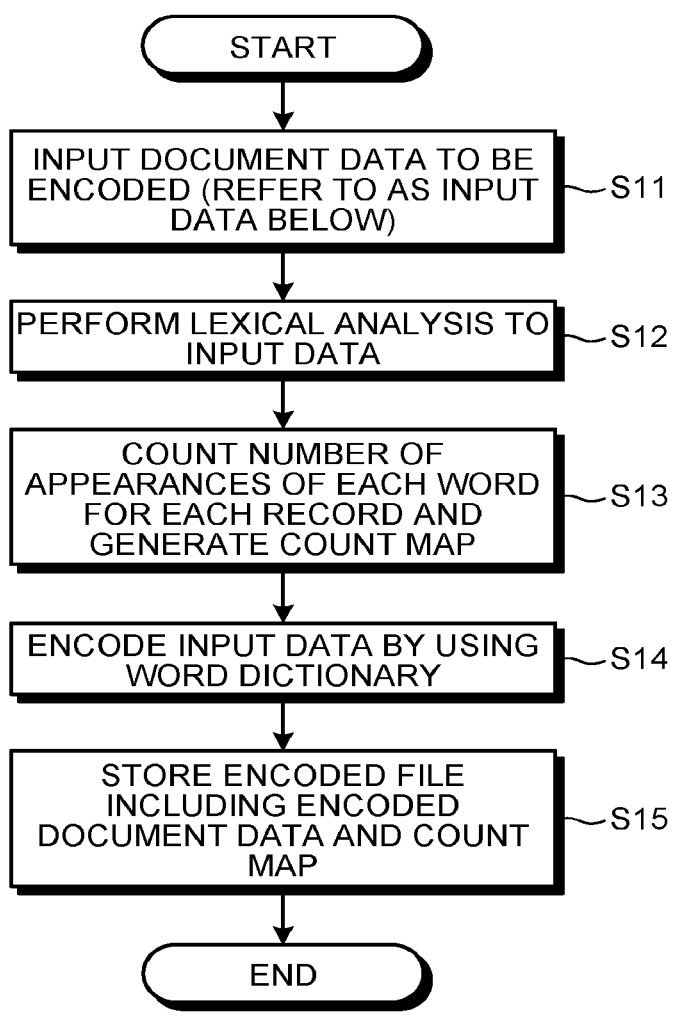
FIG. 7 is a flowchart of a processing procedure of an encoding unit according to the embodiment.

FIG. 7 is a flowchart of a processing procedure of an encoding unit according to the embodiment.

As illustrated in FIG. 7, the encoding unit 110 inputs the document data to be encoded (step S11). The document data to be encoded includes a plurality of records in the non-encoded state. The document data to be encoded will be referred to as an input data below.

The encoding unit 110 performs the lexical analysis to the input data (step S12). For example, the encoding unit 110 divides each record included in the input data into word units.

Subsequently, the encoding unit 110 counts the number of appearances of each word for each record and generates the count map 132 (step S13). For example, the encoding unit 110 selects the records in order. The encoding unit 110 counts the number of appearances of the word included in the selected record. The encoding unit 110 counts the number of appearances of the word relative to all the records. The encoding unit 110 generates the count map 132 by using the number of appearances for each record and each word. The encoding unit 110 stores the count map 132 to the storage unit 130.

Subsequently, the encoding unit 110 encodes the input data by using the word dictionary 131 (step S14). For example, the encoding unit 110 selects the divided words in the input data in order. The encoding unit 110 obtains a compression code of the selected word from the word dictionary 131. The encoding unit 110 allocates the obtained compression code to the selected word. The encoding unit 110 allocates the compression codes to all the divided words and generates the encoded data of the input data.

Subsequently, the encoding unit 110 stores the encoded file 133 including the encoded document data (encoded data) and the count map 132 to the storage unit 130 (step S15). For example, the encoding unit 110 sets the encoded data to the encoded file 133 and sets the count map 132 to the trailer part of the encoded file 133. The encoding unit 110 sets the pointer to the count map 132 stores in the trailer part to the header part of the encoded file 133. The encoding unit 110 stores the encoded file 133 to the storage unit 130.

Processing Procedure of Data Processing

Figure 8:
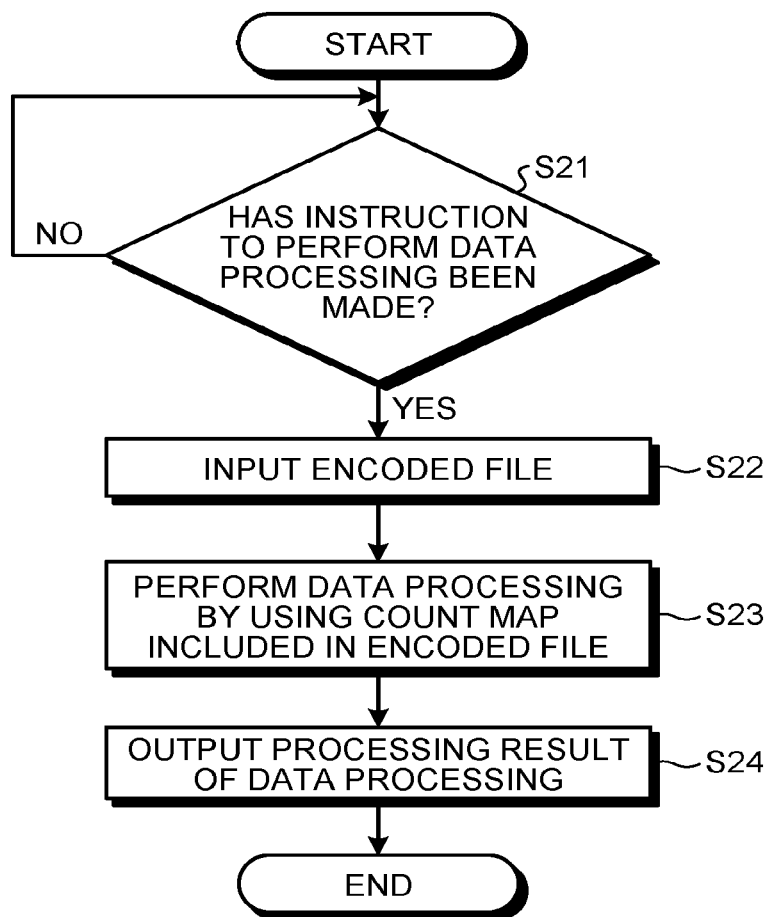
FIG. 8 is a flowchart of a processing procedure of a data processing unit according to the embodiment.

FIG. 8 is a flowchart of a processing procedure of a data processing unit according to the embodiment.

As illustrated in FIG. 8, the data processing unit 120 determines whether an instruction to perform the data processing has been made (step S21). When determining that the instruction to perform the data processing has not been made (step S21; No), the data processing unit 120 repeats the determination processing before the instruction to perform the data processing is made.

On the other hand, when determining that the instruction to perform the data processing has been made (step S21; Yes), the data processing unit 120 inputs the encoded file 133 to which the data processing is performed (step S22). The data processing unit 120 performs the data processing by using the count map 132 included in the encoded file 133 (step S23).

The data processing unit 120 outputs the processing result of the data processing (step S24). Accordingly, when performing the data processing based on the encoded file 133, the data processing unit 120 can reduce the processing time from the instruction to perform the data processing to the time when the execution result is obtained by performing the data processing without extending the encoded file 133.

Exemplary Implementation of Data Management Processing

Next, an exemplary implementation of data management processing according to the embodiment will be described with reference to FIGS. 9 and 10.

Figure 9:
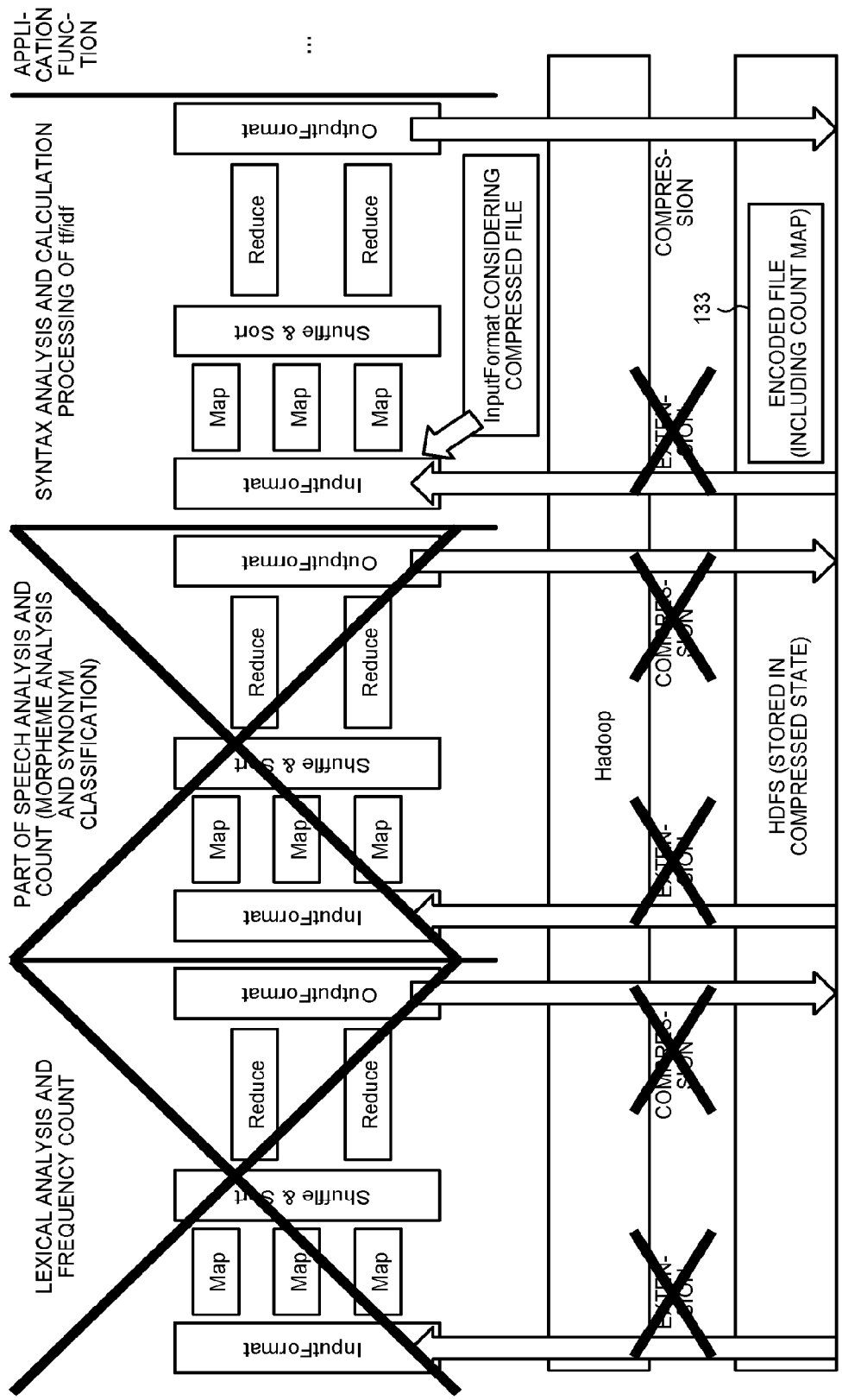
FIG. 9 is a diagram of an exemplary implementation of data management processing according to the embodiment.

FIG. 9 is a diagram of an exemplary implementation of the data management processing according to the embodiment. In FIG. 9, an exemplary implementation in a case where the data processing in text mining is applied to the Hadoop is illustrated. In the Hadoop, in the HDFS, the encoded file 133 compressed (encoded) by the encoding unit 110 is managed. The encoded file 133 holds the count map 132. The HDFS uses a compressed library having the content according to the present embodiment.

As illustrated in the right side of FIG. 9, the data processing in the data mining is performed from the syntax analysis and the calculation processing of tf/idf. For example, when receiving the instruction to perform the syntax analysis and the calculation processing of tf/idf, "InputFormat" corresponding to the data processing unit 120 obtains the count map 132 from the trailer part of the encoded file 133 to which the data processing is performed. "InputFormat" makes applications of "Map", "Shuffle&Sort", and "Reduce" perform the syntax analysis and the calculation processing of tf/idf by using the count map 132.

When the data management processing according to the embodiment is implemented to the Hadoop, the lexical analysis and frequency count in the left side of FIG. 9 are not needed. This is because the encoding unit 110 generates the frequency information (count map 132) which is the result of the frequency count and holds it to the encoded file 133 when compressing (encoding) the file in the non-encoded state.

Also, when the data management processing according to the embodiment is complemented to the Hadoop, part of speech analysis and count in the middle of FIG. 9 are not needed. This is because the word dictionary 131 corresponds the basic word to the part of speech. In addition, this is because the encoding unit 110 generates the frequency information (count map 132) which is the result of the frequency count and holds it to the encoded file 133 when compressing (encoding) the file in the non-encoded state.

Figure 10:
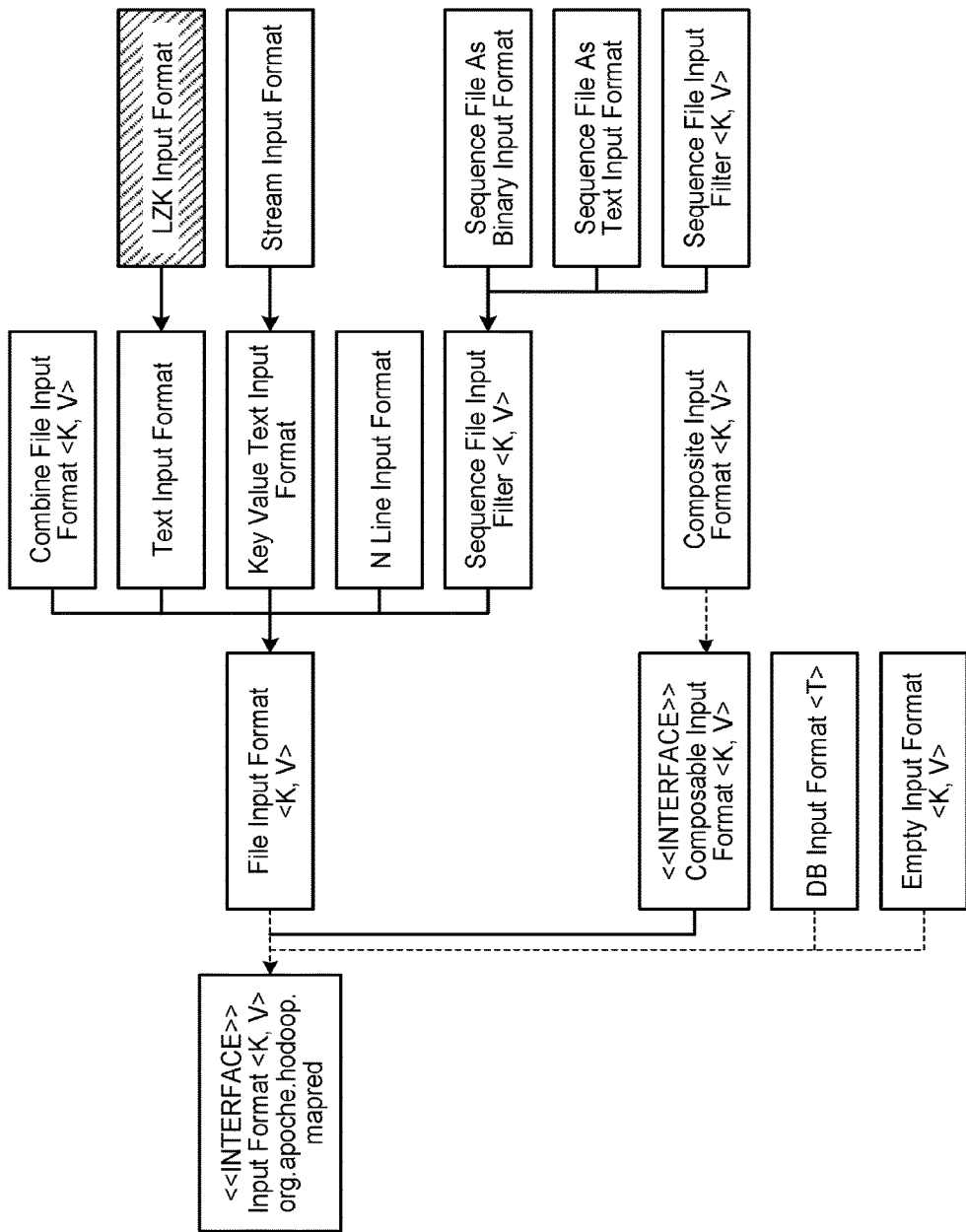
FIG. 10 is a diagram of an exemplary implementation of InputFormat.

FIG. 10 is a diagram of an exemplary implementation of InputFormat. As illustrated in FIG. 10, "LZKInputFormat" is added to the existing and implemented interface of "InputFormat".

In the conventional data management processing, when the lexical analysis and the frequency count in the text mining are performed, the lexical analysis and the frequency count are performed by extending the compressed (encoded) encoded file and using the extended data. In the data management processing, the extended data is compressed while the lexical analysis is performed to the data after the execution of the processing. Also, in the data management processing, when the part of speech analysis and count in the text mining are performed, the part of speech analysis and count are performed by extending the compressed encoded file and using the extended data. In the data management processing, the extended data is compressed while the lexical analysis is performed to the data after the execution of the processing. Also, in the data management processing, when the syntax analysis and the tf/idf in the text mining are performed, the syntax analysis and the tf/idf are performed after extending the compressed encoded file and using the extended data and performing the frequency count. In the data management processing, the extended data is compressed while the lexical analysis is performed to the data after the execution of the processing. In this way, in the conventional data management processing, since the same processing (for example, the compression processing, the extension processing, the lexical analysis, and the frequency count) is repeated many times, it is difficult to efficiently perform the data processing in the text mining.

Whereas, in the data management processing according to the embodiment, the frequency information is generated at the stage of encoding the file in the non-encoded state, and the generated frequency information is held in the encoded file 133. Therefore, the data processing in the text mining can be efficiently performed. As a result, in the data management processing according to the embodiment, regarding a computer for performing the processing, a processing amount of a plurality of kinds processing to obtain the same result can be reduced. In addition, in the data management processing according to the embodiment, the processing time from the instruction to perform the data processing to the time when the execution result is obtained can be reduced.

Also, since the data management processing according to the embodiment integrally stores the count information and the encoded data, data in the non-encoded state (plain text data) is not needed, and a storage capacity can be reduced.

Effects of Embodiment

In this way, in the embodiment, the information processing apparatus 100 encodes text data by using the word dictionary 131 for allocating a code to each word in the word group and generates the frequency information indicating the appearance frequency in the text data of each word in the word group. The information processing apparatus 100 associates the generated frequency information with the encoded text data and stores it to the storage unit 130. With the above structure, the information processing apparatus 100 can output the frequency information without extending the encoded text data and can reduce the processing time of the text mining.

Also, in the above embodiment, when receiving an instruction to analyze the appearance frequency of each word in the encoded text data, the information processing apparatus 100 outputs the frequency information associated with the encoded text data. With the above structure, the information processing apparatus 100 can reduce the processing time of the analysis processing to the appearance frequency of each word by using the output frequency information. That is, when performing the analysis processing to the appearance frequency of each word in the encoded text data, the information processing apparatus 100 can reduce the processing time from an instruction to perform the analysis processing to a time when the execution result is obtained.

Also, in the above embodiment, the information processing apparatus 100 generates the frequency information by a unit in which the text data is divided into a predetermined unit regarding each word in the word group. With the above structure, the information processing apparatus 100 generates the frequency information for each record (document) so as to use the generated frequency information in the text mining.

Hardware Structure of Information Processing Apparatus

Figure 11:
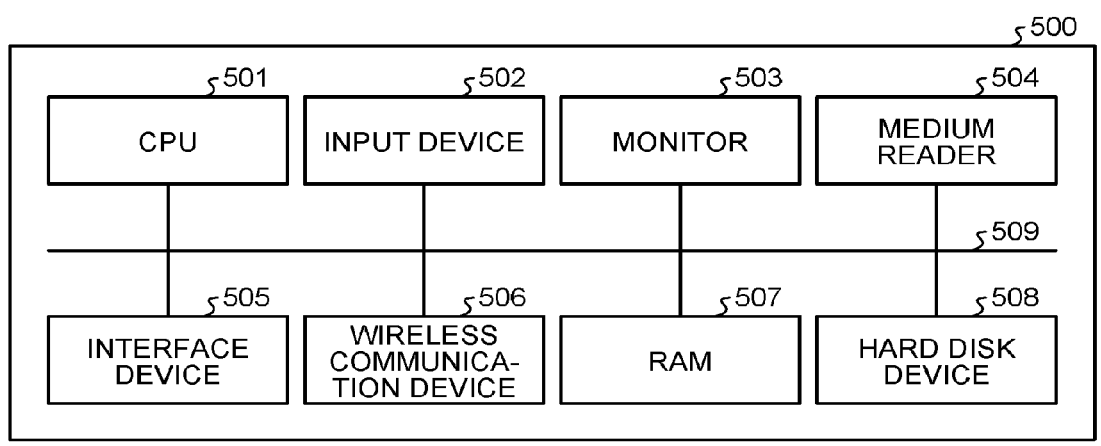
FIG. 11 is a diagram of an exemplary hardware structure of the information processing apparatus.

FIG. 11 is a diagram of an exemplary hardware structure of the information processing apparatus. As illustrated in FIG. 11, a computer 500 includes a CPU 501 for performing various operation processing, an input device 502 for receiving a data input from a user, and a monitor 503. Also, computer 500 includes a medium reader 504 for reading a program and the like from storage media, an interface device 505 to connect to other device, and a wireless communication device 506 to wirelessly connect to other device. Also, the computer 500 includes a random access memory (RAM) 507 for temporarily storing various information and a hard disk device 508. Also, each of the devices 501 to 508 is connected to a bus 509.

The hard disk device 508 stores a data management program having a function similar to that of the encoding unit 110 and the data processing unit 120 illustrated in FIG. 3. Also, the hard disk device 508 stores various data to realize the data management program. Various data includes the data in the storage unit 130 illustrated in FIG. 3.

The CPU 501 performs various processing by reading each program stored in the hard disk device 508 and developing it to the RAM 507 and executing it. These programs can make the computer 500 function as each function unit illustrated in FIG. 3.

The document processing program is not needed to be stored in the hard disk device 508. For example, the program stored in the storage media from which can be read by the computer 500 may be read and performed by the computer 500. The storage media which can be read by the computer 500 corresponds to, for example, portable recording media such as a CD-ROM, a DVD disk, and a universal serial bus (USB) memory, a semiconductor memory such as a flash memory, and a hard disk drive. Also, the program is stored in a device connected to a public line, the Internet, and a local area network (LAN), and the computer 500 may read and perform these programs.

According to one embodiment of the present invention, when text mining processing is performed based on encoded data, a processing time from an instruction to perform text mining processing to a time when the execution result is obtained can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a data management program that causes a computer to execute a process comprising:

encoding text data by using an encoding dictionary that allocates each of a plurality of words in a word group to a corresponding code to generate an encoded file;

simultaneously with the encoding of the text data, generating frequency information indicating an appearance frequency of the plurality of words in the word group in the text data;

simultaneously with the encoding of the text data, storing the frequency information to a storage unit associating the frequency information with the encoded text data;

storing the generated encoded file in a file management system;

causing applications including MapReduce to calculate, in response to an instruction, a similarity between documents included in the encoded file using the frequency information stored in the storage unit without converting the encoded text data into a non-encoded state; and performing syntax analysis and term frequency/inverse document frequency (tf/idf) in text mining without extension of the encoded file and without a repeated execution of lexical analysis and frequency count.

2. The non-transitory computer-readable recording medium according to claim 1, wherein the process further includes:
   outputting the frequency information associated with the encoded text data when an instruction to analyze the appearance frequency for each word in the encoded text data is received.

3. The non-transitory computer-readable recording medium according to claim 1, wherein the generating includes generating the frequency information by a unit in which the text data is divided into a predetermined unit.

4. An information processing apparatus, comprising:
   a processor, wherein the processor executes:
      encoding text data by using an encoding dictionary that allocates each of a plurality of words in a word group to a corresponding code to generate an encoded file;
      simultaneously with the encoding of the text data, generating frequency information indicating an appearance frequency of the plurality of words in the word group in the text data;
      simultaneously with the encoding of the text data, storing the frequency information to a storage unit associating the frequency information with the encoded text data;
      storing the generated encoded file in a file management system;
      causing applications including MapReduce to calculate, in response to an instruction, a similarity between documents included in the encoded file using the frequency information stored in the storage unit without converting the encoded text data into a non-encoded state; and
      performing syntax analysis and term frequency/inverse document frequency (tf/idf) in text mining without extension of the encoded file and without a repeated execution of lexical analysis and frequency count.

5. A data management method executed by a computer, the data management method comprising:
   encoding, by a processor, text data by using an encoding dictionary that allocates each of a plurality of words in a word group to a corresponding code to generate an encoded file;
   simultaneously with the encoding of the text data, generating, by the processor, frequency information indicating an appearance frequency of the plurality of words in the word group in the text data;
   simultaneously with the encoding of the text data, storing the frequency information to a storage unit associating the frequency information with the encoded text data;
   storing the generated encoded file in a file management system;
   causing applications including MapReduce to calculate, in response to an instruction, a similarity between documents included in the encoded file using the frequency information stored in the storage unit without converting the encoded text data into a non-encoded state; and
   performing syntax analysis and term frequency/inverse document frequency (tf/idf) in text mining without extension of the encoded file and without a repeated execution of lexical analysis and frequency count.

* * * * *